United States Patent [19]

Luyckx

[11] Patent Number: 4,477,099
[45] Date of Patent: Oct. 16, 1984

[54] ARTICULATED COACH AIR TRANSFER SYSTEM

[75] Inventor: Robert R. Luyckx, Troy, Mich.

[73] Assignee: General Motors Corporation, Detroit, Mich.

[21] Appl. No.: 450,050

[22] Filed: Dec. 15, 1982

[51] Int. Cl.³ .............................................. B60D 7/02
[52] U.S. Cl. ........................................ 280/421; 98/2; 105/8 A; 296/178; 296/208
[58] Field of Search ............... 280/403, 420, 421, 424; 296/178, 208; 105/8 R, 8 A, 18, 19, 20; 98/2, 2.15, 40 C

[56] References Cited

U.S. PATENT DOCUMENTS 2,009,823 7/1935 Van Vulpen et al. ............. 105/8 A

FOREIGN PATENT DOCUMENTS 1024112 3/1953 France ............................... 296/178

Primary Examiner—Joseph F. Peters, Jr.
Assistant Examiner—D. Lynn Fugate
Attorney, Agent, or Firm—Patrick M. Griffin

[57] ABSTRACT

An air transfer system joins the plenum of a first vehicle section to the plenum of a second vehicle section in an articulated coach vehicle with minimal deflection or intrusion into the passenger space. A generally V-shaped collection manifold in the rear vehicle section carries air from a plenum to an outlet near the end and top center of the rear section. A similar manifold in the front section carries air from an inlet near the end and top center of the front section to the other plenum. A bellows of a relatively stiff rectangular cross-section joins the outlet and inlet to complete the connection, and deflects as the vehicle sections rotate without passenger space intrusion.

2 Claims, 5 Drawing Figures

ARTICULATED COACH AIR TRANSFER SYSTEM

This invention relates to an air transfer system and specifically to such a system for transferring ventilating air from a plenum in a first coach vehicle section to a plenum in a second coach vehicle section articulated thereto.

BACKGROUND OF THE INVENTION

In coach vehicles such as busses, it is often desirable to feed ventilating or cooling air from the back of the coach section, where the engine is generally located, through a roof mounted plenum to the rest of the vehicle. This has advantages over feeding the air directly into the interior of the vehicle itself. This, however, presents problems when the coach vehicle is of the articulated type with a first vehicle section rotatably attached to a second vehicle section. The plenums in the vehicle must be connected and still allow the coach vehicle to articulate. An obvious solution is to connect the plenum in one section to the plenum in the other section by flexible conduits. This creates problems in that each conduit would require sufficient extra length to allow it to expand sufficiently as the coach vehicle articulates. Thus, the conduit on the opposite side would hang down obtrusively in the passenger space because of the required slack.

SUMMARY OF THE INVENTION

The air transfer system of the present invention provides a connection between the coach vehicle section plenums which flexes with such sections as they articulate symmetrically about the same axis, with no obstructive intrusion into the passenger space. In the disclosed embodiment, the plenums of the first and second vehicle sections each terminate in a collection and distribution manifold which has respective outlets and inlets near the end of a respective vehicle section. A linkage mechanism joins the vehicle sections together for relative pivotal movement about an axis generally perpendicular thereto. A bellows conduit of a generally rectangular crosssection joins the outlet and inlet of the respective first and second vehicle section manifolds together. The cross-section of the conduit is relatively shallow and does not intrude into the passenger space and it is symmetrically flexible about the same pivot axis as the vehicle sections. Therefore, the conduit flexes with a minimum of displacement as the coach sections pivot relative to one another.

It is therefore an object of the invention to provide an air transfer system between the coach sections of an articulated vehicle which has minimum intrusion into the passenger space.

It is a further object of the invention to provide such an air transfer system which flexes symmetrically about the same pivot axis as the coach sections to provide a minimum displacement thereof.

BRIEF DESCRIPTION OF THE DRAWINGS

These and other objects of the invention will appear from the following written description and drawings in which.

DESCRIPTION OF THE PREFERRED EMBODIMENT

Figure 1:
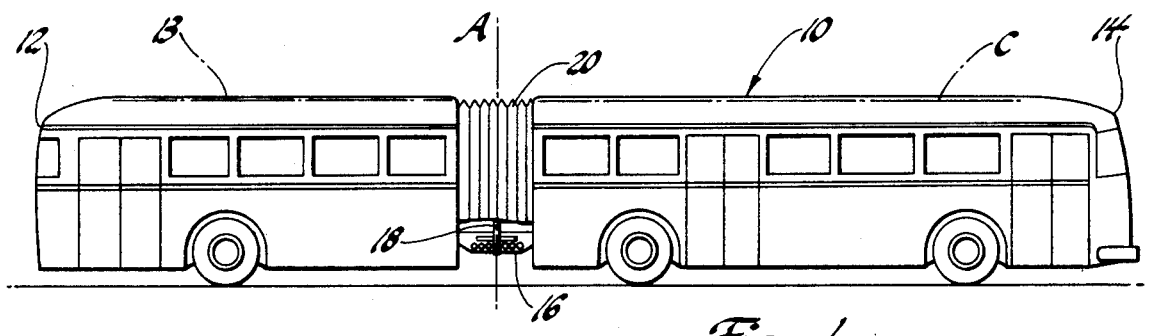
FIG. 1 is a side view of a coach having first and second vehicle sections connected by an exterior bellows partially broken away to show the linkage also connecting the vehicle sections.
Figure 2:
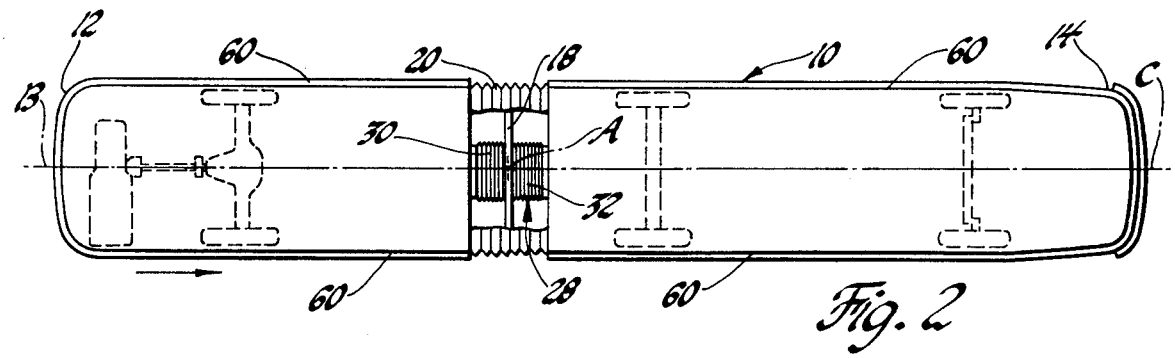
FIG. 2 is a top plan view of the vehicle sections with the exterior bellows partially broken away to show the flexible conduit.
Figure 3:
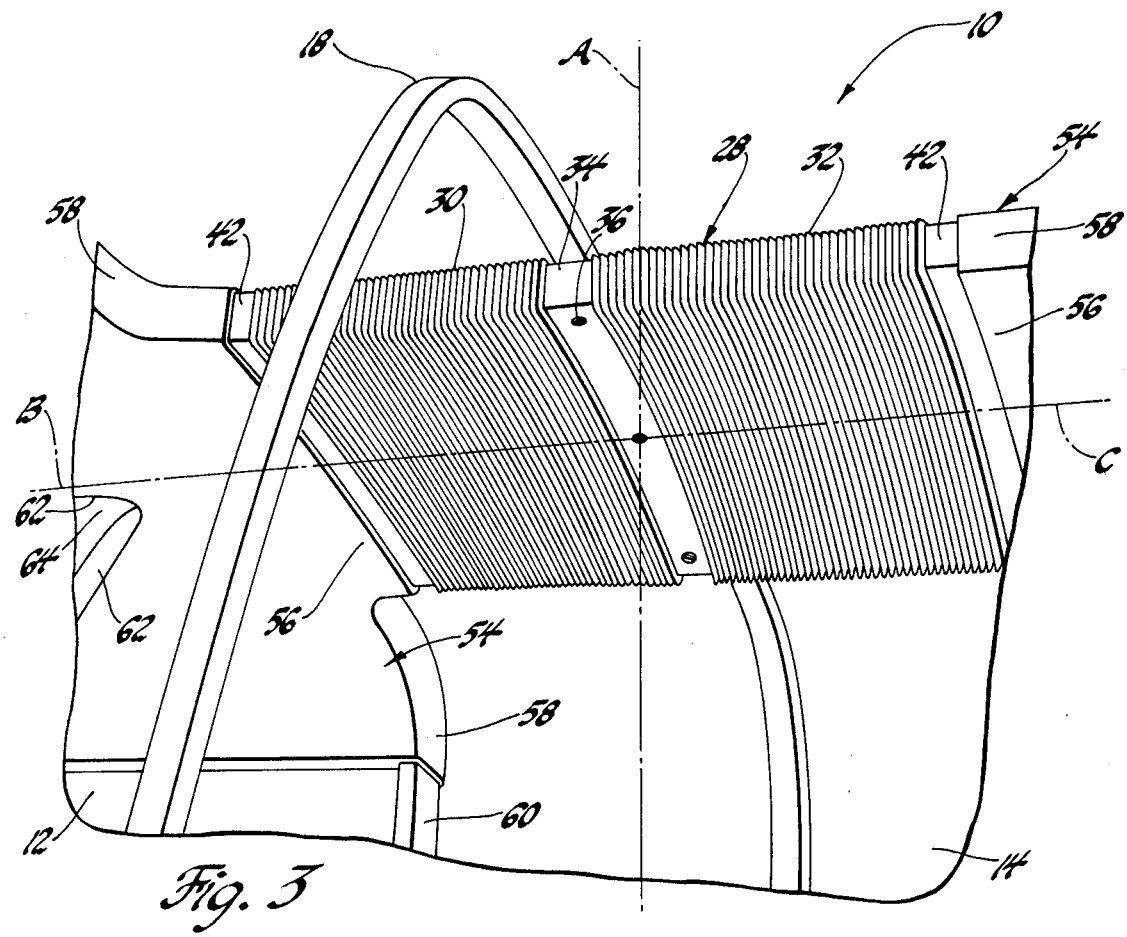
FIG. 3 is a perspective view of the interior of the vehicle sections beneath the bellows conduit with the exterior bellows removed.

Referring first to FIGS. 1 and 2, an articulated coach vehicle designated generally at 10 includes a first or rear vehicle section 12 and a second or front vehicle section 14. The longitudinal center axes of the sections 12 and 14 are designated by dash lines B and C. Lines B and C are co-linear in FIG. 2 but this will only occur on a straightaway because the front of rear section 12 and the rear of front section 14 are rotatively joined together by a linkage mechanism 16, the details of which may be found in application Ser. No. 303,393, Johanne W. Rosenkrands, Hinge Connection for Articulated Vehicles, filed Sept. 18, 1981, now U.S. Pat. No. 4,405,143, and assigned to the assignee of the present invention. It suffices for the present description to note that sections 12 and 14 pivot about the vertical pivot axis of linkage 16, denoted A in FIG. 1, which is perpendicular to and intersects the B and C axes. A central rib 18, which, as seen in FIG. 3, has an inverted U-shape, is joined to linkage 16 in such a way as to in effect float between sections 12 and 14 as they pivot about axis A, without changing its angular position relative to axis A.

Figure 5:
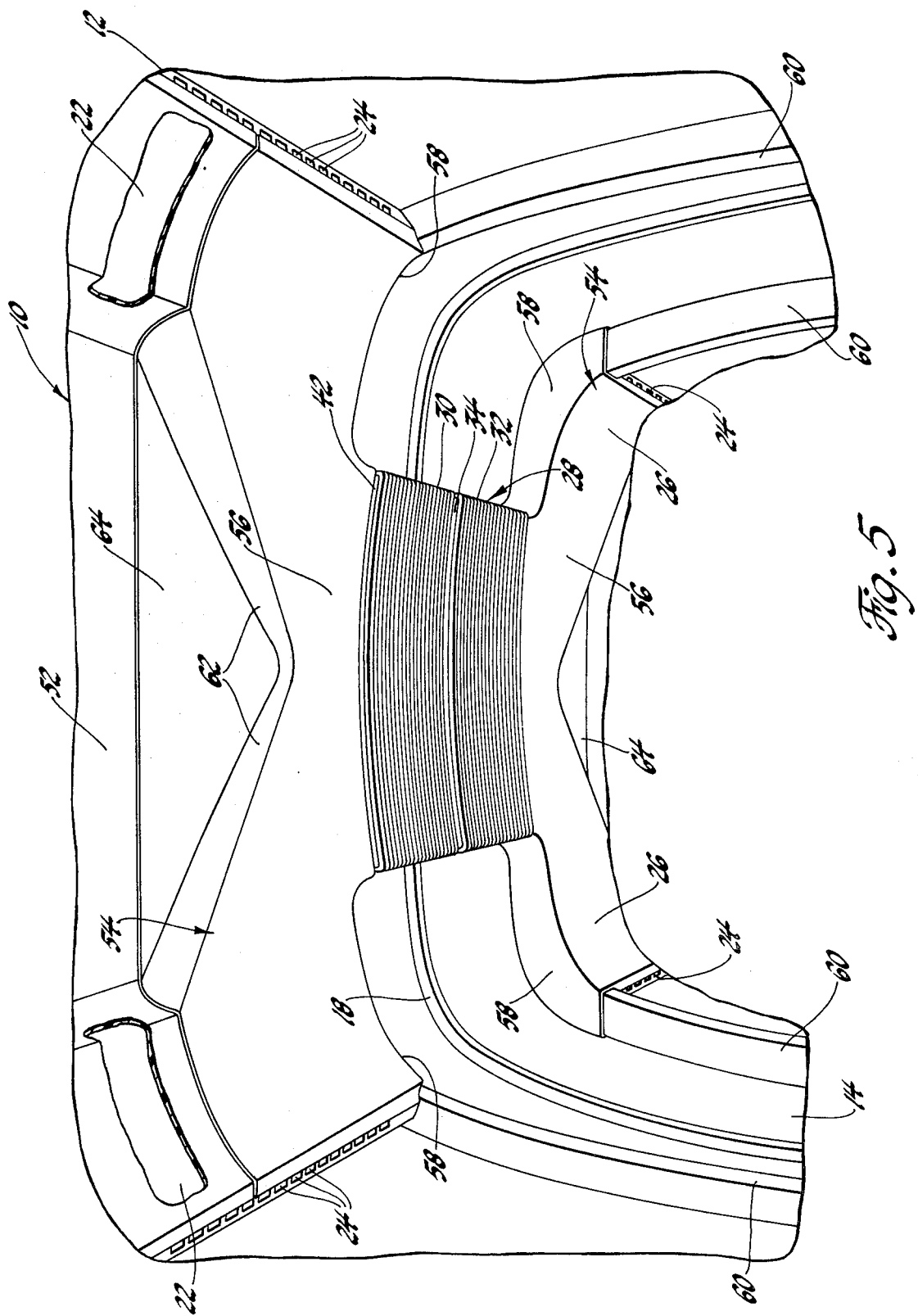
FIG. 5 is an interior perspective view looking forwardly from the front of the rear portion of the vehicle section with the exterior bellows removed.

Still referring to FIGS. 1 and 2, the interiors of sections 12 and 14 are joined by an exterior bellows 20 which runs between the front of rear section 12 and the rear of front section 14 and which also encloses a central U-shaped rib 18 and linkage mechanism 16 to protect them and passengers from the weather. While the interior spaces of the vehicle sections are thus connected, a means must still be found to move ventilating air from one to the other. This is because, as best seen in FIG. 5, the ventilating air is fed from a blower at the rear of section 12, not shown, into a plenum comprised of a pair of shallow, tunnel like plenum passages 22, each of which runs down the side of the ceiling of the vehicle section just above the window line, feeding air through vent openings 24 into the interior space. Similar plenum passages 26 with vent openings 24 are included in vehicle section 14. Passages 22 and 26 are best seen in FIG. 5.

Figure 4:
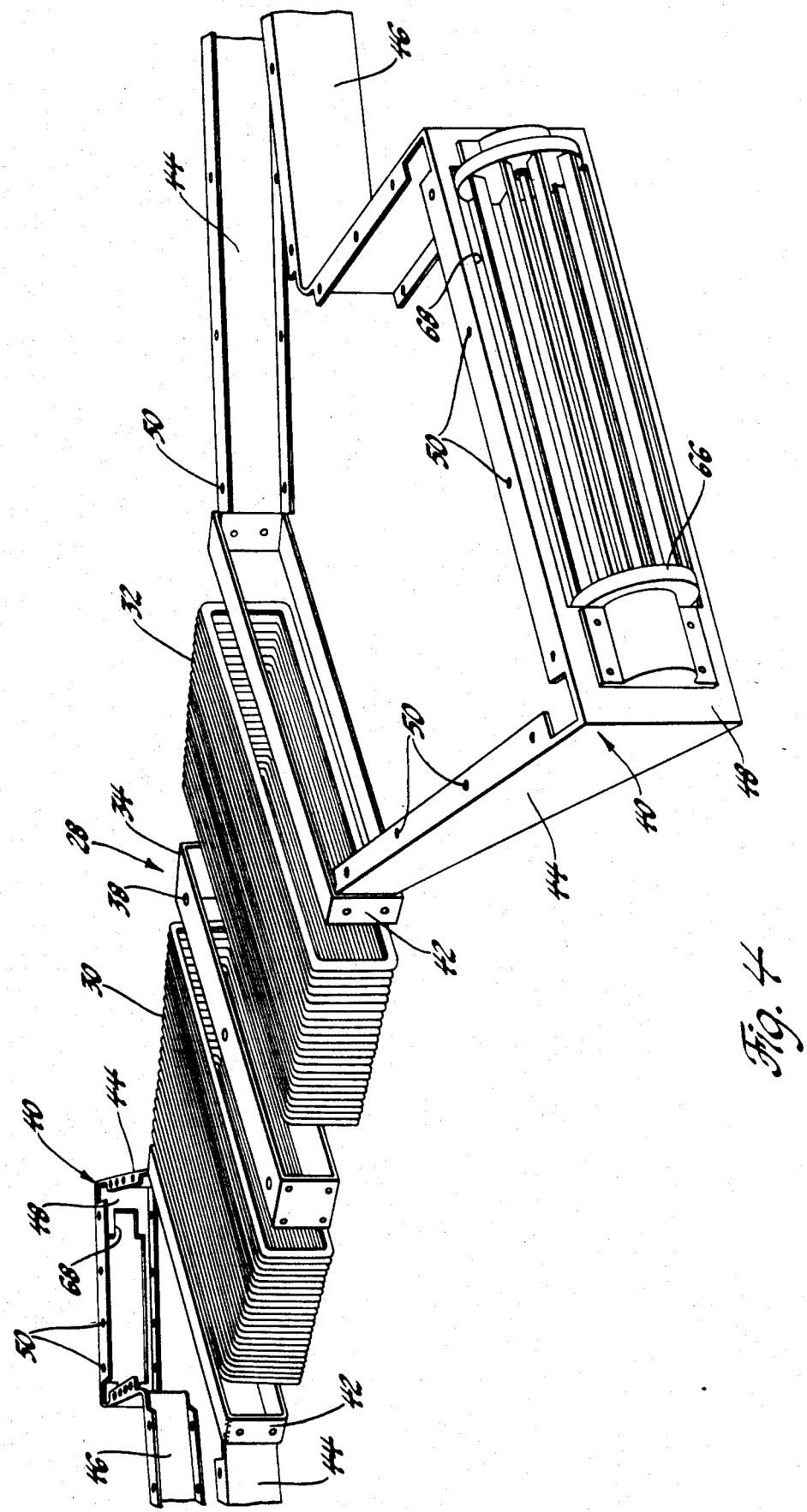
FIG. 4 is an exploded view of the bellows conduit and manifolds.

Plenum passages 22 and 26 give a better air distribution than that which would result from simply feeding air directly into the interior of section 12 at the back thereof. However, passages 22 and 26 must be joined to each other by a conduit which does not intrude into the passenger space or deflect excessively. The present invention provides such a conduit designated generally 28 and best seen in FIGS. 2, 3 and 5. Conduit 28 is of the bellows type and is symmetrical to both the center axes B and C. As seen in FIG. 4, bellows conduit 28 consists of a pair of like sized flexible bellows members 30 and 32 of a shallow and relatively stiff rectangular cross-section. The adjacent one ends of bellows members 30 and 32 are joined by a central rigid connector 34 of similar cross-section which is, in turn, joined to the underside of the bight portion of central rib 18 by bolts 36 passing through bolt holes 38, FIG. 4.

A collection and distribution manifold joins the remote end of each bellows member 30 and 32 to a respective plenum passage 22, 26 of the coach sections 12 and 14. Referring to FIG. 4, each manifold includes an identically shaped frame 40 with a connector 42 of cross-section similar to connector 34. The connectors 42 comprise the outlet and inlet of respective collection and distribution manifolds. Two flanged side members 44 diverge in a wide V pattern from each connector 42. A V-shaped flanged divider member 46 has each leg thereof joined to the end of a respective side member 44 by a flanged port member 48. Side members 44, divider member 46 and port members 48 are integrally formed of sheet metal and the top flanges thereof include a plurality of bolt holes 50.

The collection and distribution manifold frames 40 are bolted through their top flanges to the roof 52 of each of the respective vehicle sections 12 and 14 symmetrically to axes B and C to close the upper opening of the frame. Each port member 48 communicates with an end of plenum passages 22 and 26 respectively. The connector 42 of each manifold frame 40 is conventionally joined to the remote end of one of the bellows members 30 or 32. After roof attachment, each manifold frame 40 is covered with an integrally molded cover member 54 best seen in FIGS. 3 and 5. Each cover member 54 includes a central portion 56 at one end which overlies and abuts the lower flange of a respective manifold frame 40; a pair of lateral side portions 58 which extend to the end of the roof 52 of the vehicle secton and over the ends of the side walls 60 of the vehicle section; a generally V-shaped portion 62 which extends upwardly and is juxtaposed to a divider member 46; and a web section 64 which is joined to the V-shaped portion 62 and is positioned immediately adjacent the roof 52 of the vehicle section. Thus, each cover member 54 overlies the ends of a respective plenum passage 22 or 26 and a manifold frame 40 and cooperates with roof 52 of a respective vehicle section 12 or 14 to form inflow and outflow passages which communicates with respective plenum passages 22 or 26 and which are in turn connected through the bellows members 30 and 32 and connector 34. Each cover member 54 is conventionally secured to a respective vehicle section 12 or 14.

As the vehicle sections 12 and 14 pivot about the vertical axis A, the bellows members 30 and 32 will flex sinuously back and forth about the same axis. There will be no deflection downwardly into the passenger space, and the side deflection will be minimal as the conduit 28 is symmetrically disposed about the B and C axes. In addition, the air flow from the coach section 12 to the coach section 14 may be aided by squirrel cage blowers 66, one of which is shown in FIG. 4 in the openings 68 in port members 48 in either or both manifold frames 40. Further, if a different linkage 16 were used, without the floating rib 18, then a collection and distribution manifold formed and attached identically to the vehicle sections 12 and 14, but with a continuous bellows member 28 of stiffer cross-section to prevent sag, would work to transfer air in the same way. Such a design would flex about its own natural flex points rather than being rigidly tied to a linkage pivot axis as disclosed. However, it would still not flex into the passenger space. Such a transfer means could, of course, also be disposed in the bottom of the vehicle coach sections as long as it was disposed symmetrically about the same axes.

The embodiments of the invention in which an exclusive property or privilege is claimed are defined as follows:

1. In an articulated coach vehicle of the type having first and second vehicle sections pivoted together at adjacent ends thereof for relative rotative movement about a vertical pivot axis, means for transferring ventilating air from a plenum in the first vehicle section to a plenum in the second vehicle section, comprising, a collection manifold in the first vehicle section having a plurality of inflow passages connected to the plenum of the first vehicle section and merging into an outlet proximate the end of the first vehicle section, a distribution manifold in the second vehicle section having an inlet proximate the end of the second vehicle section and opening to a plurality of outflow passages connected to the plenum of the second vehicle section, and a bellows conduit connected between the inlet and outlet of the respective distribution and collection manifolds and extending normal to the vertical pivot axis, said bellows conduit being symmetrically flexible about the vertical pivot axis as the vehicle sections pivot relative to one another to provide minimum displacement of the bellows conduit.

2. In an articulated coach vehicle of the type having first and second coach sections pivoted together between adjacent ends thereof for relative rotative movement, means for transferring ventilating air from a plenum in the first vehicle section to a plenum in the second vehicle section, comprising, a collection manifold in the first vehicle section having a plurality of inflow passages connected to the plenum of the first vehicle section and merging into an outlet proximate the end of and symmetrical to the longitudinal center axis of the first vehicle section, a distribution manifold having an inlet proximate the end of and symmetrical to the longitudinal center axis of the second vehicle section and opening to a plurality of outflow passages connected to the plenum of the second vehicle section, and a bellows conduit connected between the inlet and outlet and being symmetrically disposed about the longitudinal center axes of the vehicle sections, said bellows conduit flexing symmetrically with respect to the center axes of the vehicle sections as the vehicle sections pivot relative to one another to provide minimum displacement of the bellows conduit.

* * * * *